US012060986B2

(12) United States Patent
Block et al.

(10) Patent No.: US 12,060,986 B2
(45) Date of Patent: Aug. 13, 2024

(54) LUMINAIRE WITH INTEGRATED SELF-TEST

(71) Applicant: ZUMTOBEL LIGHTING GMBH, Dornbirn (AT)

(72) Inventors: Steffen Block, Hörbranz (AT); Andreas Radler, Hard (AT); Thomas Steffens, Lindenberg im Allgäu (DE)

(73) Assignee: Zumtobel Lighting GmbH, Dornbirn (AT)

( * ) Notice: Subject to any disclaimer, the term of this patent is extended or adjusted under 35 U.S.C. 154(b) by 122 days.

(21) Appl. No.: 17/791,350

(22) PCT Filed: Jan. 8, 2021

(86) PCT No.: PCT/EP2021/050316

§ 371 (c)(1),
(2) Date: Jul. 7, 2022

(87) PCT Pub. No.: WO2021/140230

PCT Pub. Date: Jul. 15, 2021

(65) Prior Publication Data

US 2023/0040404 A1 Feb. 9, 2023

(30) Foreign Application Priority Data

Jan. 10, 2020 (DE) ..................... 10 2020 100 399.4

(51) Int. Cl.
*H05B 47/20* (2020.01)
*F21V 23/04* (2006.01)
*F21V 25/02* (2006.01)

(52) U.S. Cl.
CPC ............ *F21V 23/045* (2013.01); *F21V 25/02* (2013.01); *H05B 47/20* (2020.01)

(58) Field of Classification Search
CPC .... F21V 23/045; F21V 25/02; F21V 23/0435; F21V 23/0442; F21V 23/003;
(Continued)

(56) References Cited

U.S. PATENT DOCUMENTS 8,738,158 B2 * 5/2014 Sims .................... H05B 47/155 700/20
10,285,247 B2 * 5/2019 Mueller ................. H05B 31/50
(Continued)

FOREIGN PATENT DOCUMENTS

DE 10 2010 000902 A 6/2011
DE 10 2014 110581 A1 1/2016
(Continued)

OTHER PUBLICATIONS

PCT/EP2021/050316, International Search Report and Written Opinion dated Mar. 24, 2021, 15 pages.

*Primary Examiner* — Ryan Jager
(74) *Attorney, Agent, or Firm* — Andrus Intellectual Property Law, LLP

(57) ABSTRACT

The invention relates to a luminaire (10) comprising illuminants (170) for generating light, and a control unit (110) for controlling the illuminants (170), and at least one further element (140), in particular an operator control element (143) or a sensor (142), for generating control information that influences the operation of the luminaire (10), wherein the control unit (110) is configured in such a way that a self-test is carried out after a supply voltage has been applied to the luminaire (10). Said self-test is carried out automatically and independently in an analysis mode of the luminaire (10), wherein the control unit (110) checks the luminaire (10) for the presence and/or the functionality of the at least one further element (140). Depending on the checking result, and the type of further unit (140) checked, the control unit (110) controls the illuminants (170) such that a tempo-
(Continued)

rally variable light emission (171) signals the checking result. Measuring devices (200, 210, 220) are additionally specified which detect the checking result by measurement of operating parameters of the luminaire (10) and present this information preferably by way of a display (211, 221) of the measuring device (200, 210, 220). A method is likewise specified which includes checking the at least one further element (140) and controlling the illuminants (170) by means of the control unit (110).

15 Claims, 2 Drawing Sheets

(58) Field of Classification Search
CPC ... F21V 23/0407; H05B 47/20; H05B 47/105; H05B 47/165; H05B 47/17; H05B 47/195; H05B 47/18; F21S 6/00
USPC .......................................................... 315/291
See application file for complete search history.

(56) References Cited

U.S. PATENT DOCUMENTS

2009/0026978 A1* 1/2009 Robinson ............. H05B 47/175 315/294
2011/0204824 A1* 8/2011 Sims .................... H05B 47/155 315/312
2013/0043794 A1* 2/2013 Hartmann .............. H05B 47/22 315/132
2014/0354177 A1* 12/2014 Cavalcanti ........... H05B 47/175 315/312
2015/0332586 A1* 11/2015 Hamm ................... H05B 47/19 340/12.5
2017/0311421 A1* 10/2017 Mueller ............... H05B 47/115
2018/0368221 A1* 12/2018 Johnson ................ H02J 7/0068
2019/0018383 A1* 1/2019 Geguine ............... G01J 1/0228

FOREIGN PATENT DOCUMENTS

DE 19758987 B4 2/2017
WO 2007095740 A1 8/2007

* cited by examiner

LUMINAIRE WITH INTEGRATED SELF-TEST

CROSS-REFERENCE TO RELATED APPLICATION

The present application is the U.S. national stage application of international application PCT/EP2021/050316 filed Jan. 8, 2021, which international application was published on Jul. 15, 2021 as International Publication WO 2021/140230 A1. The international application claims priority to German Patent Application 10 2020 100 399.4 filed Jan. 10, 2020.

TECHNICAL FIELD OF THE INVENTION

The invention relates to a luminaire having illuminants for generating light, and a control unit for controlling the illuminants, wherein the control unit is designed such that a self-test is carried out after application of a supply voltage to the luminaire.

BACKGROUND OF THE INVENTION

From previous practice, luminaires and, in particular, methods with luminaires are known whose functionality or the functionality of the various components—in particular, illuminants, control unit, and also at least one sensor—of the luminaire is checked by the luminaire to be checked being coupled via a communications interface—in particular, via a wireless communications interface—to an operator control device and then being controlled in a certain manner via the operator control device. The reaction of the luminaire or the reaction of the components of the luminaire here provides information about the functionality of the luminaire and/or the functionality of the components of the luminaire. For example, for this purpose, the luminaire is integrated into a network or at least coupled to a corresponding mobile device (in particular, mobile phone or tablet or laptop) via which the corresponding test control of the luminaire takes place. The method described is used to check whether the individual components of a luminaire are correctly connected to one another, and whether this connection is working properly.

This hitherto customary procedure is relatively complex, since, for one, it is time-intensive, because the luminaire is first coupled to a corresponding operator control device in a first working step and/or is integrated into a network with a corresponding operator control device, and, following this, the luminaire or the individual components of the luminaire are controlled via the operator control device, wherein the reaction of the luminaire to this control is monitored, as a result of which the functionality of the luminaire or the functionality of the individual components of the luminaire is determined. In addition, after the check, the luminaire is to be disconnected from the operator control device and/or network so that the luminaire can be used in a simple manner by the end user.

The performance of these working steps for checking the functionality of a luminaire or components of a luminaire requires specially trained technical personnel, special operator control devices with corresponding software, and/or a network—for example, an internet connection. The procedure so far customary is thus time-consuming and cost-intensive.

SUMMARY OF THE INVENTION

The aim of the invention is to specify a luminaire or a method for autonomously and automatically checking the functionality of the luminaire.

According to the invention, this aim is achieved with the subject matter stated in the independent claims. Particular embodiments of the invention are given in the dependent claims.

According to the invention, a luminaire is provided which has

- illuminants for light generation,
- a control unit for controlling the illuminants, and also
- at least one further element—in particular, an operator control element or a sensor—for generating control information, which influences the operation of the luminaire.

According to the invention, the control unit of the luminaire is designed to check, in an analysis mode after application of a supply voltage to the luminaire, the presence and/or the functionality of the at least one further element and to signal the result of the check by means of a temporally-variable light output of the illuminants. The temporally-variable light output is effected by a corresponding control by the control unit, wherein the control of the illuminants by the control unit is dependent upon the result of the check for the presence and/or the functionality of the at least one further element.

In addition, according to the invention, a measuring device having a measuring element and, further preferably, having a display for checking the functionality of a luminaire according to the invention is proposed. The measuring element is designed in such a way that operating parameters of the luminaire are captured, and that the measuring device recognizes the functionality of the luminaire on the basis of the captured operating parameters, wherein this information about the functionality of the luminaire is preferably displayed via the display of the measuring device.

A method for checking the functionality of a luminaire according to the invention is also proposed according to the invention. The method is characterized in that, after application of an operating voltage, the control unit of the luminaire in an analysis mode independently checks for the presence and/or the functionality of the at least one further element and signals the result of the check by means of a temporally-variable light output of the illuminants.

The design of the control unit of the luminaire provides a particularly simple and cost-effective way of checking the functionality of the luminaire or the presence and/or the functionality of the at least one further element. Likewise, the design of the measuring device simplifies capturing the information about the functionality of the luminaire or the presence and/or the functionality of the at least one further element of a luminaire, wherein the result is automatically output. Not only the luminaire according to the invention, but also the measuring device according to the invention thus significantly simplify checking the functionality of a luminaire or the presence and/or the functionality of the at least one further element of a luminaire. This simplification has the consequence that no special operator control devices with special software and/or specially trained technical personnel are required for operating and/or checking the luminaire.

A particularly suitable embodiment of the luminaire is provided by the luminaire having at least one internal communications interface—in particular, a DALI BUS—which is designed such that communication between the control unit and the illuminants and the at least one further element is made possible.

By means of such an internal communications interface, the control unit can check the presence and/or the functionality of the at least one further element in a particularly simple manner. This internal communications interface makes it possible for the control unit to send control signals to the illuminants and/or to the at least one further element, and additionally to send response messages from the at least one further element to the control unit.

Also advantageously, the luminaire is equipped with an interface for connecting at least one external further element to the at least one internal communications interface.

As a result, sensors and/or operating elements which are not installed in the luminaire can also send control information to the control unit, wherein the control unit can respond to the control information of these further external elements.

Furthermore, the luminaire is, advantageously, designed such that at least one of the at least one further elements is a pushbutton switch, or a presence sensor, or a movement sensor, or a brightness sensor, or a temperature sensor, or a voltage drop sensor.

By such a design of the at least one further element, the luminaire is provided with an operator control element and/or a sensor, as a result of which the luminaire sends a control signal to the control unit either upon inputs of a user (for example, by actuation of the pushbutton switch) or automatically (for example, by means of a change in brightness), whereupon the control unit controls the illuminants on the basis of the control information received.

In a further embodiment, the luminaire is designed such that the at least one further element is an emergency module for detecting fluctuations and/or a drop in the supply voltage of the luminaire.

By means of such an emergency module, when a falling voltage is detected or when an undershooting or an overshooting of a specific voltage reference value is detected, corresponding control information is sent to the control unit, whereupon the control unit reacts, e.g., by activating the current supply of the luminaire by means of an integrated current storage device (for example, a battery). It is also conceivable for the control unit to initiate a reduced light brightness of the illuminants when control information is received by the emergency module.

Particularly preferably, the luminaire is designed such that, in the analysis mode, the temporally-variable light output for signaling the result of the check is dependent upon the type of the at least one further element that is present in the luminaire and that is checked.

This embodiment ensures that the results of the check for the presence and/or the functionality of the at least one further element differ from one another depending upon the type of the at least one further element, as a result of which the result of the check and the type of the at least one further unit checked can be recognized by means of simple observation or by simple measurement of the temporally-variable light output.

Particularly preferably, the temporally-variable light output is designed such that it differs with respect to its light brightness and/or light duration and/or light sequence. As a result, a sufficient number of possibilities are created for generating different temporally-variable light outputs, so that each result of the checking of the luminaire or of the checking of the at least one further element of the luminaire can be unambiguously assigned to a temporally-variable light output.

Furthermore, the luminaire is, advantageously, designed in such a way that, following the analysis mode, it transitions autonomously and automatically into a default mode, wherein the luminaire in the default mode is independently functional and reacts to control information of the at least one further element.

A luminaire is thus created which can easily be put into operation immediately after autonomous checking of the functionality of the luminaire or the functionality and/or the presence of the at least one further element, irrespective of the place of use or intended use of the luminaire. Likewise, no special configuration of the luminaire is required in order to make it ready for use. It is preferably provided here that the default mode be designed such that the light sources are controlled by the control unit as soon as control information of the at least one further element is sent to the control unit. For example, it can be provided here that the light sources be switched on continuously, e.g., for ten minutes, and then either dimmed or switched off, wherein other time values and/or other changes in the light output are also conceivable. By means of this embodiment, a luminaire can be tested in a particularly simple manner and then used directly at a desired place of use.

Furthermore, the luminaire is particularly suitably designed such that default values for the settings for light output are stored in the control unit, wherein this setting for light output can be changed by a user so that the luminaire behaves in accordance with these user-defined settings.

By storing default values for the settings for the light output in the control unit in this way, the luminaire behaves in accordance with these default settings and reacts to received control information in accordance with the default settings.

According to a further embodiment, the settings for light output can be modified so that the luminaire behaves in accordance with these new settings for the light output. In this case, the luminaire is, particularly advantageously, designed such that a user can store user-defined settings in the control unit, wherein the luminaire then behaves in accordance with these user-defined settings. As a result, the user can store different settings for light output for different items of control information, for example, as a result of which the flexibility and diversity of the luminaire is further increased.

The luminaire is particularly suitably designed such that the luminaire is equipped with at least one communications means—in particular, a wireless module—which makes it possible to integrate the luminaire into a network.

As a result, several luminaires can be combined in a network or in a lighting network, wherein it is conceivable for the luminaires to communicate with one another so that, for example, the triggering of control information by a sensor of a first luminaire also reaches control units of further luminaires in the network, and these respond accordingly.

According to a further embodiment of the luminaire, it is designed such that, after application of a supply voltage, it goes over directly into a user mode, provided that:

a) user-defined settings for light output are stored in the control unit, or b) the luminaire is integrated into a network.

This makes it possible for the analysis mode and the default mode following the analysis mode to be bypassed as soon as the user has stored user-defined settings in the luminaire and/or the luminaire has been integrated into a network, so that the luminaire is ready for operation immediately after application of the supply voltage, without any brief, preceding functionality check. This is particularly advantageous, since, each time the luminaire is started or each time a supply voltage is applied, the control unit always checks the functionality of the luminaire again and, by specific control of the illuminants, displays this, until the user independently modifies the luminaire, either by storing user-defined settings for light output in the control unit or by incorporating the luminaire into a network.

As soon as the settings for the light output are changed by a user, the luminaire goes into a so-called user mode during operation, wherein it behaves in user mode in accordance with the settings defined by the user. In this case, the user can individually store settings for light output adapted to the application scenario of the luminaire, after which the use of the luminaire is particularly flexible and simple.

It is also conceivable for a luminaire which is maintained in a network to receive control commands from the network so that the luminaire can be integrated into an existing lighting network in a particularly simple manner.

According to a further embodiment, the measuring device for checking the functionality of a luminaire is designed such that the operating parameter of the luminaire captured by the measuring element of the measuring device is a) a temporally-variable light output of the illuminants of the luminaire, or b) the power consumption of the luminaire.

As a result, embodiments of the measuring device that are simple to realize are shown, whereby the measuring device can check the functionality of the luminaire. With the illustrated method of checking, two different approaches are described, wherein a wireless check (by capture of the temporally-variable light output of the luminaire) and a wired check (by measurement of the power consumption of the luminaire) are shown.

A particularly suitable implementation of the method for checking the functionality of a luminaire is given by the fact that the control unit, by means of control of the illuminants, signals the result of checking:

a) a single further element of the luminaire, in each case following the check of the tested individual further element, or b) all further elements present in the luminaire, following the check of the last further element, or c) at least one further element after receipt of an item of control information, which was preferably triggered by a user and was preferably generated by a further element.

According to a further embodiment of the method for checking the functionality of a luminaire, the method is characterized in that an external measuring device with at least one measuring element:

a) captures the temporally-variable light output of the luminaire and automatically determines the functionality of the luminaire, or b) captures and analyzes the power consumption of the luminaire, wherein the functionality of the luminaire is determined by comparing the information about power consumption against reference values stored in the measuring device, wherein the information about the functionality of the luminaire is preferably displayed via a display of the measuring device.

As a result, the result of the functional check of the luminaire is displayed in a particularly simple manner, so that a user receives the result of the check particularly rapidly and in an uncomplicated manner.

Finally, the present invention also relates to software which is provided for use in the control unit of a luminaire and contains commands which cause the control unit to carry out the method according to the invention.

BRIEF DESCRIPTION OF THE DRAWINGS

The invention will be explained in more detail below on the basis of preferred embodiments and with reference to the drawings. The following are shown.

DETAILED DESCRIPTION OF THE PREFERRED EMBODIMENTS

Figure 1:
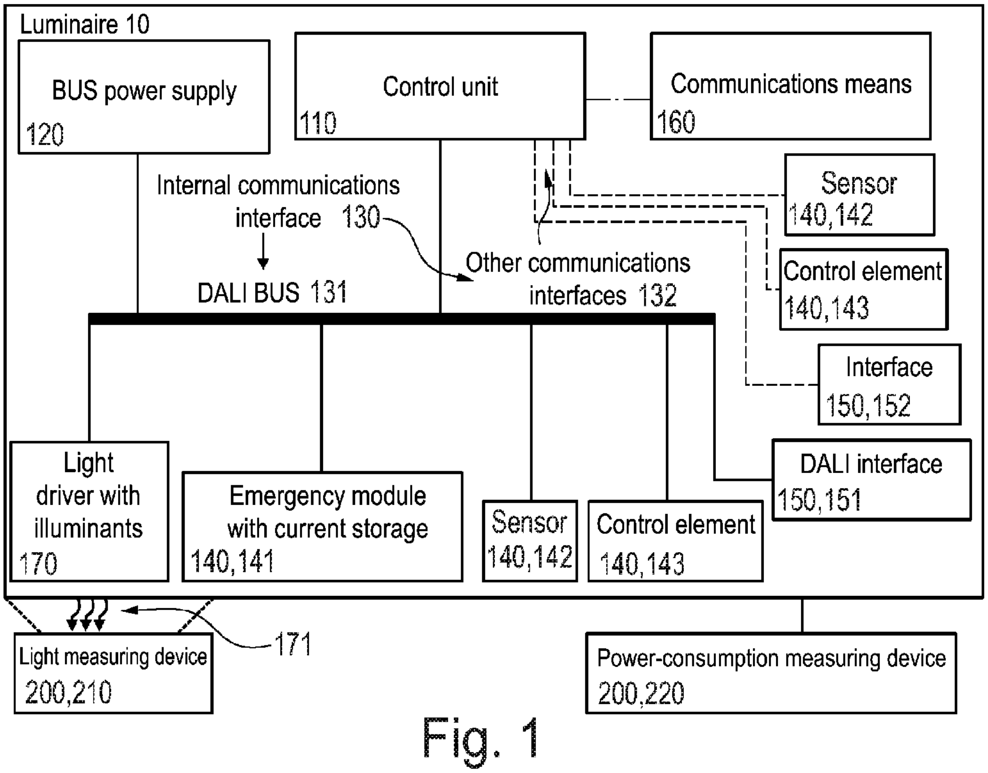
FIG. 1 shows components of an exemplary embodiment of a luminaire according to the invention and two embodiments of a measuring device.

FIG. 1 shows the structure of a luminaire 10 in a sketch with the individual components of the luminaire 10 and two embodiments of a measuring device 200 (light-measuring device 210, power-consumption measuring device 220) with the respective components.

In this case, the luminaire 10 consists of a control unit 110, which is connected to an internal communications interface 130, or to a DALI BUS 131, wherein further components are connected to the DALI BUS 131. The BUS voltage supply 120 and the light driver with illuminants 170 are likewise connected to the DALI BUS, and can therefore communicate with the control unit 110.

The control unit 110 is here designed in such a way that it controls the illuminants 170. In addition, in the embodiment of the luminaire 10 shown in FIG. 1, the control unit 110 is connected to three further elements 140 via the DALI BUS 131. The further elements 140 are in each case designed to generate control information and transmit this control information to the control unit via the DALI BUS 131, wherein the control information in each case influences the operation of the luminaire 10.

In an analysis mode following application of a supply voltage to the luminaire 10, the control unit 110 is designed to independently check the functionality and/or the presence of the at least one further element 140 and to signal the result of the check by means of a temporally-variable light output 171 of the illuminants 170. The behavior according to the invention of the control unit 110 is in this case caused by corresponding software which is stored in the control unit.

Here, the luminaire 10 is preferably designed such that the temporally-variable light output 171 is dependent upon the type of the further elements 140 that are present in the luminaire 10 and are checked. In this case, the temporally-variable light output 171 preferably differs with regard to its light brightness and/or its light duration and/or its light sequence so that, in analysis mode, different checked further elements 140 result in different temporally-variable light outputs 171, which can in particular be differentiated by mere observation.

In the embodiment shown, these three further elements 140 are formed by an emergency module 141 with current storage, a sensor 142, and an operator control element 143. The emergency module 141 can be equipped, for example, with a voltage drop sensor, so that the emergency module 141 detects fluctuations and/or a drop in the supply voltage of the luminaire 10, and transmits a control signal to the control unit 110 so that the control unit 110 activates the current supply via an internal current store (for example, a battery) of the emergency module and supplies the luminaire 10 with electrical energy.

According to a further embodiment, the sensor 142 can be designed as a presence sensor, or movement sensor, or brightness sensor, or temperature sensor, while the operator control element 143 can be a pushbutton switch.

These further elements 140 can send control information to the control unit 110 via the DALI BUS 131, wherein the operation of the luminaire 10 is influenced by this control information. Furthermore, a DALI interface 151 is connected to the DALI BUS 131, wherein external further elements—in particular, external sensors and/or external operator control elements—can be connected to this DALI interface 151.

In addition, in a further embodiment, the control unit 110 is connected to further elements 140 via a further communications interface 132. In particular, this will be a sensor 142 and an operator control element 143, which in each case can likewise send control information to the control unit 110 via the further communications interface 132. Here, too, the operation of the luminaire 10 is influenced by the respectively generated control information.

In addition, according to a further embodiment, a further interface 152 is connected via the further communications interface 132, according to which external further elements can likewise be connected to the luminaire 10. The external interfaces 150, formed by the interface 152 and the DALI interface 151, thus enable external further elements to be connected.

Also in this embodiment, a communications means 160—in particular, a wireless module 160—is connected to the control unit 110, wherein this communications means 160 is designed to incorporate the luminaire 10 into a network or into a lighting network so that the luminaire 10 or the control unit 110 of the luminaire 10 can communicate with the network and transmit and/or receive control signals.

As a result of the embodiment of the luminaire 10 with a communications means 160—in particular, a wireless module 160—several luminaires 10 can be connected together in a network or in a lighting network, wherein the network connection makes it possible for the luminaires 10 to communicate with one another so that, for example, the triggering of control information by a further component 140 of a first luminaire 10 in addition to the own control unit 110 also reaches further control units of further luminaires in the network, and these respond accordingly to the control information of the first luminaire 10.

After all further elements 140 present in the luminaire 10 have been checked in analysis mode, the luminaire 10, in a preferred embodiment, autonomously and automatically switches to a default mode, wherein the luminaire 10 is independently functional in this mode and reacts to control information of the at least one further element 140.

In a further embodiment, the luminaire 10 is designed such that default values for the settings for light output are stored in the control unit 110. These settings for light output are preferably changeable by a user, so that the luminaire 10 behaves in accordance with these user-defined settings as soon as user-defined settings have been stored in the control unit.

According to a further preferred embodiment, the luminaire 10 is designed in such a way that it passes directly into a user mode after application of a supply voltage, provided that user-defined settings for the light output have been stored in the control unit 110, or provided that the luminaire 10 is integrated into a network. Wherein the luminaire 10 then behaves in accordance with the control signals of the network and/or in accordance with the user-defined settings and reacts to control signals.

As a result, the luminaire 10 can be used in a particularly flexible and versatile manner, wherein the luminaire is fully functional without any user-defined settings, without further changes by the user—for example, on a construction site as a luminaire for a construction site light—and, after this, in a different scenario—for example, after use as a luminaire on a construction site, as a free-standing luminaire in an office—by simple storage of user-defined settings in another adapted manner.

FIG. 1 shows schematically two measuring devices 200 outside the luminaire 10, which check the functionality of the luminaire 10 in different ways, wherein the light-measuring device 210 registers the temporally-variable light output 171 of the illuminants 170, and receives information about the functionality of the luminaire 10 on the basis thereof. The power-consumption measuring device 220 is directly connected to the luminaire 10, wherein the power-consumption measuring device 220 detects the recorded power consumption of the luminaire 10 and, on the basis of this obtained information, draws conclusions about the functionality of the luminaire 10. Both measuring devices 200 preferably output via a display 212, 221 the information obtained about the functionality of the luminaire 10.

Figure 2:
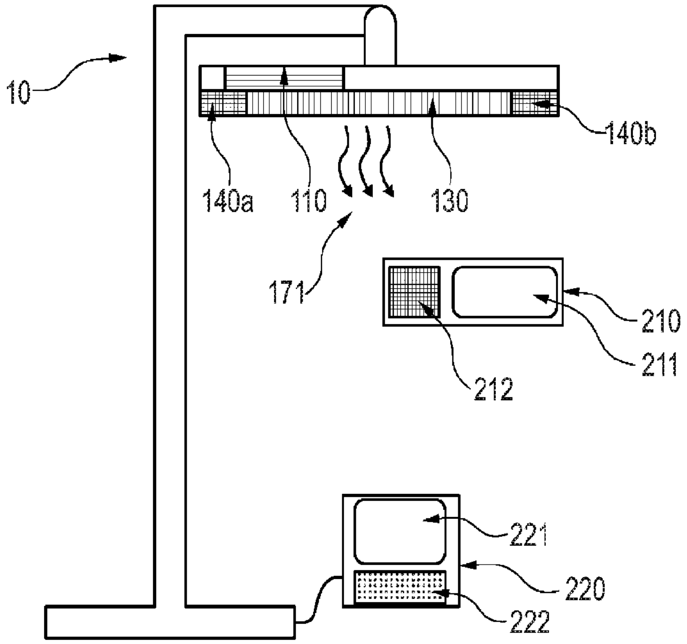
FIG. 2 is an exemplary embodiment of a luminaire according to the invention as a free-standing luminaire and two exemplary embodiments of a measuring device.

FIG. 2 shows an exemplary embodiment of a luminaire 10 according to the invention, with two exemplary embodiments of a measuring device 200, as a light-measuring device 210 and as a power-consumption measuring device 220.

In this case, the luminaire 10 is shown in a sketch as a free-standing luminaire, wherein it is quite conceivable that the luminaire 10 can also be realized differently—for example, as a suspended pendant luminaire or as a wall and/or ceiling luminaire.

In the embodiment shown, the luminaire 10 has a control unit 110, illuminants 170, and two further elements 140 (further element 140*a* and further element 140*b*), which are arranged laterally on the illuminants 170, wherein the temporally-variable light output 171 is also sketched. Further components such as a BUS voltage supply, internal communications means 130, or interfaces 150 for external connections are not shown in FIG. 2.

In the light output direction of the luminaire 10, a light measuring device 210, which has a measuring element 212 and a display 211, is shown. The measuring device 210 is used in particular during the analysis mode of the luminaire 10. In the analysis mode of the luminaire 10, after application of a supply voltage to the luminaire 10, the functionality and/or the presence of the at least one further element 140 is checked by the control unit 110, wherein the result of the check is signaled by means of a temporally-variable light output 171 of the illuminants 170 by a corresponding control by the control unit 110. This represents a possible measurement method in which the result, via the functionality check of the luminaire 10, is to be read out in analysis mode via a measurement of the temporally-variable light output 171.

FIG. 2 also shows a power-consumption measuring device 220 with at least one measuring element 222, and a display 221, wherein the power-consumption measuring device 220 is connected to the luminaire 10. In this case, the power-consumption measuring device 220 measures, in analysis mode, the power consumption of the luminaire 10, wherein, on the basis of the measured values, the power-consumption measuring device 220 receives information about the functionality of the luminaire 10, which information is preferably presented by the display 221. Due to the different temporally-variable light output 171 of the illuminants 170—arising from the different temporally-variable control of the illuminants 170 by the control unit 110 depending upon the result of the check in analysis mode—the power consumption of the luminaire 10 changes in a temporally-variable manner, as a result of which the power measuring device 220, in the same way as the light measuring device 210, receives information about the functionality of the luminaire 10.

Power-consumption measurement with the power-consumption measuring device 220 is not dependent upon external circumstances such as, for example, the ambient light, and for this reason this measurement method is preferably used with regard to measurement accuracy, since it has a lower susceptibility to interference—for example, brightness fluctuations in daylight or in other luminaires in the environment can influence measurement with the light-measuring device 210. However, it should be noted that the use of the power-consumption measuring device 220 is less flexible, since in each case a direct connection to the luminaire 10 to be tested has to be established.

In the analysis mode of the luminaire 10, the control unit 110 checks the at least one further element 140 with regard to presence and/or functionality, wherein the result is signaled via the check by means of a temporally-variable light output 171 of the illuminants 170, i.e., by means of a temporally-variable control of the illuminants 170 by the control unit 110. In one embodiment, the temporally-variable light output 171 takes place in such a way that not only the result of the check, but also the type of further element 140 checked influences the temporally-variable control of the illuminants 170 for signaling the result of the check by the control unit 110.

With regard to the signaling of the result by means of a temporally-variable light output 171, different embodiments are conceivable.

In one embodiment, the control unit 110 signals the result of the check of a single further element 140, in each case following the check of the checked individual element. If this embodiment is transferred to the embodiment of the luminaire 10 shown in FIG. 2, this means that the control unit 110 initially checks the further element **140*a* for presence and/or functionality, for example, and, following completion of the check, controls the illuminants 170 in a certain manner in a temporally-variable way, wherein this specific manner is stored in a predefined manner in the control unit 110. Following the check of the further element 140*a*, the further element 140*b* is now checked by the control unit 110, for example, wherein, here too, following completion, a temporally-variable light output 171 is initiated by the control unit 110**, and the result of the check is thus signaled.

In a further embodiment, only after completion of checking all further elements 140 present in the luminaire 10 is the result of all checks signaled by means of a temporally-variable control of the illuminants 170. If this embodiment is transferred to the embodiment of the luminaire 10 shown in FIG. 2, this means that the control unit 110 first checks the further element **140*a*, and then checks the further element 140*b*, wherein, after completion of checking the last further element, i.e., after completion of checking the further element 140*b*, the control unit 110 controls the illuminants 170, and thus a temporally-variable light output 171 is effected, wherein the temporally-variable light output 171 is dependent upon the number of further elements 140** and results of the check.

In addition, a further embodiment is conceivable, according to which the control unit 110, by means of control of the illuminants 170, signals the result of checking at least one further element 140 after receipt of control information, which was preferably triggered by a user and was preferably generated by a further element 140. If this embodiment is transferred to the embodiment of the luminaire 10 shown in FIG. 2, this means that, for example, the control unit 110 signals, by means of control of the illuminants 170, the result of checking the further element **140*a* only after control information has been received, which was sent, for example, by the further element 140*b* to the control unit 110** and which was originated by a user (for example, by a change in brightness, or movement, or pressure application).

Figure 3:
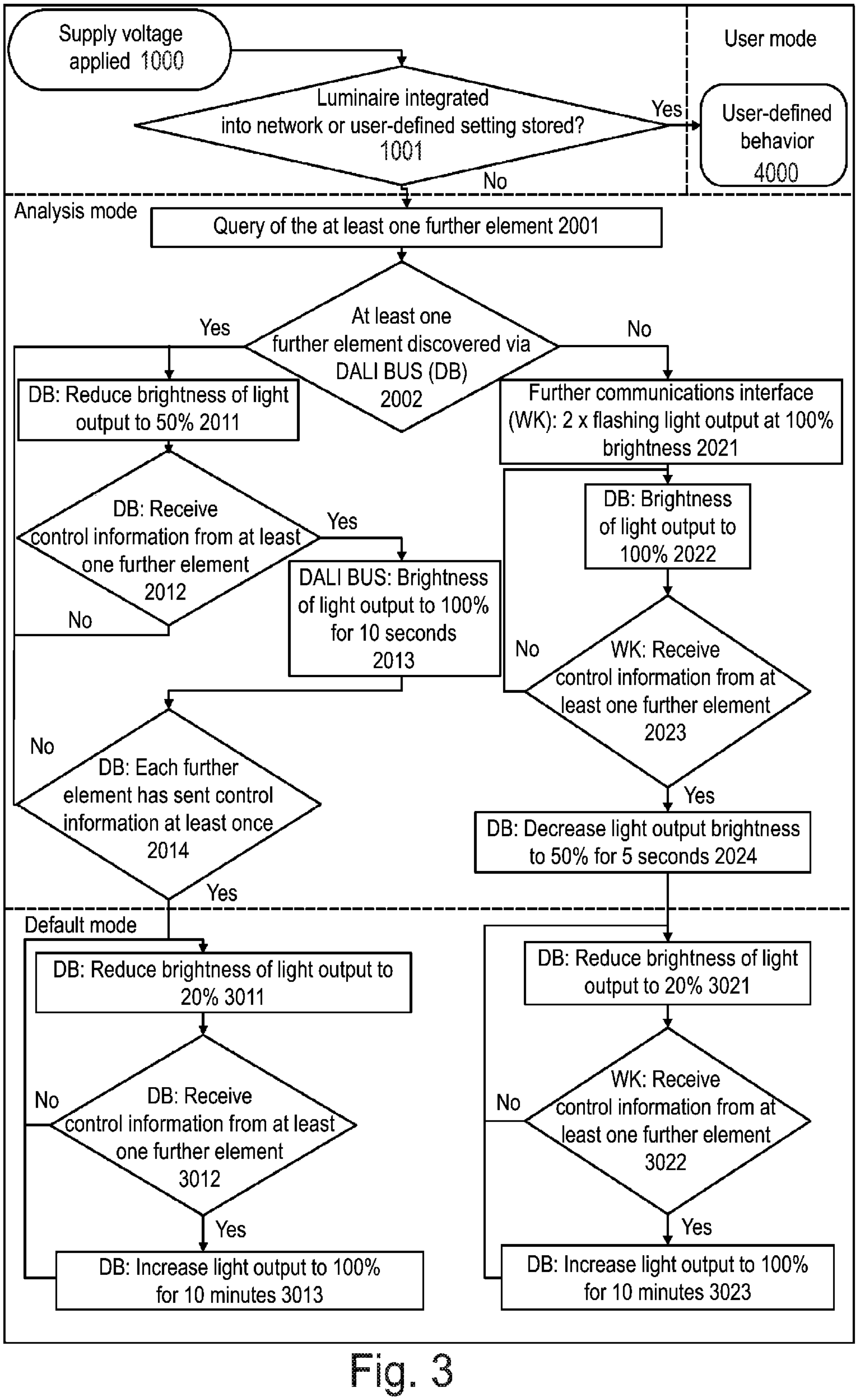
FIG. 3 shows an exemplary representation of a method according to the invention for checking and operating a luminaire by means of a flowchart.

FIG. 3 shows an embodiment of the method according to the invention for checking and operating a luminaire 10 by means of a flowchart. The numerical values mentioned in the following description for the method with respect to the light output properties (for example, duration, brightness, sequences) are used for illustration and can always be replaced by other values, wherein the basic idea of the method remains unchanged. It is also to be noted that the method as such is adaptable and scalable to a plurality of further elements 140, wherein the basic method concept will be valid irrespective of the number of components of a luminaire 10.

The starting point of the method is here the application of the supply voltage (method step 1000), whereupon the control unit 110 first checks whether the luminaire 10 is integrated into a network and/or whether user-defined settings are stored in the control unit 110 (method step 1001).

If this check is positive, the luminaire 10 will automatically go over into a user mode, wherein said luminaire behaves in a user-defined manner (method step 4000).

If the previous check is negative, the luminaire 10 will go over into analysis mode, wherein, in a first method step 2001, the at least one further element 140—or all existing further elements 140—will be interrogated. In this case, the control unit 110 determines whether at least one further element 140 has been discovered via the DALI BUS (DB) 131 (method step 2002). The control unit 110 distinguishes between the type of the at least one further element 140 (connected via DALI BUS 131 or via a further communications interface 132), wherein information about the type of further element 140 and the presence and/or functionality of the further element 140 is encoded in the kind of light output 171. It is also conceivable for different types of the at least one further element 140 to be encoded differently, so that, for example, a successful check of a brightness sensor leads to a different time-variable light output 171, such as a successful check of a temperature sensor.

If this check is negative, the control unit 110 recognizes that the at least one further element 140 is connected via a further communications interface (WK) 132. In this case, the control unit 110 controls the illuminants 170 such that, for example, a twice-flashing light output 171 takes place at 100% brightness (method step 2021).

Following this temporally-variable light output 171, the control unit 110 controls the illuminants 170 via the DALI BUS 131 such that the brightness of the light output 171 is set, for example, to 100% (method step 2022).

A further check is then carried out via the further communications interface 132, wherein the control unit 110 expects control information from at least one further element 140 (method step 2023).

If the control unit 110 receives the control information from at least one further element, the control unit 110 will instruct the illuminants 170, via the DALI BUS 131, to reduce the brightness of the light output 171 for, for example, five seconds to 50% (method step 2024).

If the control unit 110 does not receive any control information from at least one further element 140, it will leave the brightness of the light output 171 at 100% (method step 2022).

Following the method step 2024, the luminaire 10 autonomously and automatically goes into default mode, provided that no further element 140 was previously detected via the DALI BUS 131. In this case, the control unit 110 controls the illuminants 170 in such a way that the brightness of the light output is reduced to 20% (method step 3021).

The control unit 110 then expects control information from at least one further element 140 (method step 3022).

If the control unit 110 receives the control information from at least one further element 140, the control unit 110 will instruct the illuminants 170 via the DALI BUS 131 to increase the brightness of the light output for, for example, 10 minutes to, for example, 100% (method step 3023).

If the control unit 110 does not receive any control information from at least one further element 140 and/or the ten minutes of light output to 100% has elapsed (see method step 3023), the control unit 110 will instruct the illuminants 170 via the DALI BUS 131 to reduce the brightness of the light output to, for example, 20% (method step 3021).

If the first query in analysis mode as to whether at least one further element 140 has been detected via DALI BUS 131 (see method step 2002), the control unit 110 will instruct the illuminants 170, via the DALI BUS 131, to reduce the brightness of the light output 171 to, for example, 50% (method step 2011).

In a further step, the control unit 110 expects control information from at least one further element 140 (method step 2012).

If the control unit 110 receives this control information via the DALI BUS 131 from at least one further element 140, the control unit 110 will control the illuminants 170 via the DALI BUS 131 such that the brightness of the light output 171 will be set to, for example, 100% for, for example, ten seconds (method step 2013).

If no control information has been received from at least one further element 140 via the DALI BUS 131, the control unit 110 will, via the DALI BUS 131, instruct the luminaire 170 again to reduce the brightness of the light output 171 to, for example, 50% (method step 2011).

Following the ten-second light output 171 at 100% brightness (method step 2013), the control unit 110 checks, via the DALI BUS 131, whether any further element 140 has sent control information at least once (method step 2014).

If this check is negative, the control unit 110 will instruct the illuminants 170 via the DALI BUS 131 to reduce the brightness of the light output 171 to, for example, 50% (method step 2011).

If the query in method step 2014 is positive, the luminaire 10 will go over into a default mode, wherein the control unit 110, via the DALI BUS 131, controls the illuminants 170 with a reduced brightness of the light output 171 of, for example, 20% (method step 3011).

The control unit 110 then checks whether control information is being received from at least one further element 140 (method step 3012).

If this occurs, the illuminants 170 will be instructed by the control unit 110 via the DALI BUS 131 to increase the brightness of the light output 171 for, for example, ten minutes to, for example, 100% (method step 3013).

If the latter query is negative, and/or should the ten minute light output 171 to 100% have elapsed (see method step 3013), the control unit 110 will instruct the illuminants 170 to reduce the brightness of the light output 171 to, for example, 20% (method step 3011).

The exemplary embodiment of the method shown in FIG. 3 includes only the method steps within the luminaire 10, wherein no embodiment of the method is shown for information processing and capture in the measuring device 200, 210, 220.

In one embodiment, the method in the measuring device 200, 210, 220 consists essentially of the capture of one or more operating parameters of the luminaire 10, e.g., by a measuring element 212, 222, wherein the information obtained is compared with data stored in the measuring device 200, 210, 220, whereby the measuring device 200 can draw conclusions about the functionality of the luminaire 10. The information about the functionality is then, particularly preferably, presented by means of a display 211, 221 of the measuring device 200, 210, 220, whereby a user can check the functionality of the luminaire 10 in a particularly simple manner.

In one embodiment, a light measuring device 210 has at least one measuring element 212 and preferably has a display 211, wherein the measuring element 212 detects the temporally-variable light output 171 of the luminaire 10 and automatically detects the functionality of the luminaire 10, and, preferably, the information about the functionality of the luminaire 10, by means of the display 211.

According to a further embodiment, a power-consumption measuring device 220 with a measuring element 222 is provided which captures and analyzes the power consumption of the luminaire 10, wherein the functionality of the luminaire 10 is determined by comparing the information about the power consumption with reference values stored in the measuring device 220, wherein the information about the functionality of the luminaire 10 is preferably presented via a display 221 of the measuring device 220.

The invention claimed is:

1. A luminaire (10), having:

illuminants (170) for generating light, a control unit (110) for controlling the illuminants (170), and also at least one further element (140) comprising an operator control element (143) or a sensor (142) for generating control information, which influences the operation of the luminaire (10), wherein the control unit (110) is designed to check, in an analysis mode after application of a supply voltage to the luminaire (10), the functionality and/or the presence of the at least one further element (140) and to signal the result of the check by means of a temporally-variable light output (171) of the illuminants (170); and the luminaire (10) is designed such that it autonomously and automatically goes into a default mode after analysis mode, wherein the luminaire (10) is independently functional in default mode and reacts to control information of the at least one further element (140).

2. The luminaire according to claim 1, wherein the luminaire (10) has at least one internal communications interface (130) comprising a DALI BUS (131)—which is designed such that communication between the control unit (110) and the illuminants (170) and the at least one further element is made possible.

3. The luminaire according to claim 2, wherein the luminaire (10) is equipped with an interface (150) for connecting at least one external further element to the at least one internal communications interface (130).

4. The luminaire according to claim 1, wherein at least one of the at least one further elements (140) is a pushbutton switch, or a presence sensor, or a movement sensor, or a brightness sensor, or a temperature sensor, or a voltage drop sensor.

5. The luminaire according to claim 1, wherein the at least one further element (140) is an emergency module (141) for detecting fluctuations and/or a drop in the supply voltage of the luminaire (10).

6. The luminaire according to claim 1, wherein the temporally-variable light output (171) is dependent upon the type of further elements (140) that are present in the luminaire (10) and are checked.

7. The luminaire according to claim 1, wherein the temporally-variable light output (171) is designed such that it differs with respect to its light brightness and/or light duration and/or light sequence.

8. The luminaire according to claim 1, wherein default values for the settings for light output are stored in the control unit (110), wherein said settings for light output are changeable by a user so that the luminaire (10) behaves in accordance with these user-defined settings.

9. The luminaire according to claim 8, wherein the luminaire (10) is designed such that it directly goes into a user mode after application of a supply voltage, provided that:

a) user-defined settings for light output are stored in the control unit (110), or b) the luminaire (10) is integrated into a network.

10. The luminaire according to claim 1, wherein the luminaire (10) is equipped with at least one communications means (160) comprising a wireless module (160), which enables the luminaire (10) to be integrated into a network.

11. A measuring device (200, 210, 220), having a measuring element (212, 222) and further having a display (211, 221) for checking the functionality of a luminaire (10) having:

illuminants (170) for generating light, a control unit (110) for controlling the illuminants (170), and also at least one further element (140) comprising an operator control element (143) or a sensor (142) for generating control information, which influences the operation of the luminaire (10), wherein the control unit (110) is designed to check, in an analysis mode after application of a supply voltage to the luminaire (10), the functionality and/or the presence of the at least one further element (140) and to signal the result of the check by means of a temporally-variable light output (171) of the illuminants (170); and the measuring element (212, 222) is designed in such a way that operating parameters of the luminaire (10) are captured, and the measuring device (200, 210, 220) detects the functionality of the luminaire (10) on the basis of the captured operating parameters, wherein this information about the functionality of the luminaire (10) is presented via the display (211, 222).

12. The measuring device according to claim 11, wherein the operating parameter of the luminaire (10) captured by the measuring element (212, 222) of the measuring device (200, 210, 220) is a) a temporally-variable light output (171) of the illuminants (170) of the luminaire (10), or b) the power consumption of the luminaire (10).

13. A method for checking the functionality of a luminaire having:

illuminants (170) for generating light, a control unit (110) for controlling the illuminants (170), and also at least one further element (140) comprising an operator control element (143) or a sensor (142) for generating control information, which influences the operation of the luminaire (10), the control unit (110) being designed to check, in an analysis mode after application of a supply voltage to the luminaire (10), the functionality and/or the presence of the at least one further element (140) and to signal the result of the check by means of a temporally-variable light output (171) of the illuminants (170);

wherein, after application of an operating voltage, the control unit (110) of the luminaire (10) in an analysis mode autonomously checks the functionality and/or the presence of the at least one further element (140) and signals the result of the check by means of a temporally-variable light output (171) of the illuminants (170); and further wherein an external measuring device (200, 210, 220) having at least one measuring element (212, 222):

a) captures the temporally-variable light output (171) of the luminaire (10) and automatically determines the functionality of the luminaire (10), or b) captures and analyzes the power consumption of the luminaire (10), wherein the functionality of the luminaire is determined by comparing the information about the power consumption against reference values stored in the measuring device (220), wherein the information about the functionality of the luminaire (10) is presented via a display (211, 221) of the measuring device (200, 210, 220).

14. The method according to claim 13, wherein the control unit (110) signals by means of control of the illuminants (170) the result of checking:

a) a single further element (140) of the luminaire (10), in each case following the check of the checked individual further element (140), or b) all further elements (140) present in the luminaire (10), following the check of the last further element (140), or c) at least one further element (140) after receipt of an item of control information, which was preferably triggered by a user and was preferably-generated by a further element (140).

15. Software for use in a control unit (110) of a luminaire (10), wherein the software comprises instructions which cause the control unit (110) to carry out the method according to claim 14.

* * * * *